United States Patent [19]

Anders et al.

[11] Patent Number: 4,551,670

[45] Date of Patent: Nov. 5, 1985

[54] CIRCUIT FOR MAINTAINING THE DC VOLTAGE ON AN ELECTRICALLY ISOLATED TELECOMMUNICATION LINE AT A REFERENCE LEVEL

[75] Inventors: James V. Anders, Lisle; Thomas W. Anderson, Warrenville; Daniel D. Geiger, West Chicago; George F. Turnpaugh, Naperville, all of Ill.

[73] Assignee: AT&T Bell Laboratories, Murray Hill, N.J.

[21] Appl. No.: 602,148

[22] Filed: Apr. 19, 1984

[51] Int. Cl.$^4$ .............................................. G05F 1/46
[52] U.S. Cl. ................................ 323/281; 179/18 AD
[58] Field of Search .................... 179/70, 77, 18 AD; 323/268, 280, 281

[56] References Cited

U.S. PATENT DOCUMENTS

| | | | |
|---|---|---|---|
| 4,056,689 | 11/1977 | Freimanis | 179/16 F |
| 4,056,691 | 11/1977 | Freimanis et al. | 179/18 FA |
| 4,331,913 | 5/1982 | Sparber | 323/303 |
| 4,412,347 | 10/1983 | Lipcon | 323/281 |
| 4,423,292 | 12/1983 | Turek | 179/18 FA |
| 4,481,462 | 11/1984 | deKleijn | 323/274 |
| 4,499,532 | 2/1985 | Hudson et al. | 363/21 |

FOREIGN PATENT DOCUMENTS 54-22553  2/1979  Japan .................................. 323/281

OTHER PUBLICATIONS

R. G. Sparber, "Engineer's Notes", Bell Laboratories, Inc., Doc. No. 55611-830509.01EN, May 9, 1983.

*Primary Examiner*—Peter S. Wong
*Assistant Examiner*—Judson H. Jones
*Attorney, Agent, or Firm*—Richard J. Godlewski

[57] ABSTRACT

Disclosed is a line interface circuit (103) having a negative feedback circuit (205) for maintaining the DC voltage on an electrically isolated communications line at a reference level such as ground for private branch exchanges using ground start supervisory signaling. The feedback circuit comprises a low-pass filter (301), a difference amplifier (302), and two voltage-to-current sources (303,304) each having a high output impedance. The low-pass filter passes only the voltage on the line below a predetermined frequency. The difference amplifier subtracts the passed voltage from a ground reference level to form a difference voltage. Depending on the polarity of the difference voltage, the two voltage-to-current sources source and sink current to and from the line to maintain the DC voltage on the line at the reference level. A load resistor (305) also included in the feedback circuit keeps the circuit from oscillating where the phase shift of any signal through the circuit is an integer multiple of 360 degrees. The high output impedance of the two voltage-to-current sources does not effect the impedance balance on the line.

20 Claims, 3 Drawing Figures

CIRCUIT FOR MAINTAINING THE DC VOLTAGE ON AN ELECTRICALLY ISOLATED TELECOMMUNICATION LINE AT A REFERENCE LEVEL

TECHNICAL FIELD

The invention relates generally to communication line interface circuits for use with telephone switching systems and, more particularly, to a circuit for maintaining the DC voltage on a communication line at a reference level.

BACKGROUND OF THE INVENTION

In telephone switching systems, a line circuit commonly serves as an interface between the telephone switching network and a communication line. A subscriber station set or a private branch exchange (PBX) commonly terminates the other end of the line. Traditionally, line circuits include a battery feed circuit that supplies current to the line. Line circuits also detect the on-hook and off-hook conditions of the line. Various sequences of these two line conditions are used for control signaling to request service and to provide well-known address and supervisory information. There are many different types of control signaling schemes that may be used depending on the type of line and terminal equipment.

To reduce an annoying 60-hertz signal commonly induced on the line, the impedance of the communication line conductors may be electrically balanced with respect to ground. This may be accomplished by electrically isolating the line from ground through the use of a floating or transformer-coupled battery feed circuit. The 60-hertz signal is the voltage between the conductors of the line having unequal impedances with respect to ground. This voltage, also known as metallic voltage, is the result of unequal longitudinal currents in the line conductors that are induced by electrical power lines in the vicinity of the communication line. With a balanced, electrically isolated line having a high AC impedance, the floating battery feed circuit does not unbalance the impedance of the line conductors with respect to ground.

The problem with electrically isolated lines is that they are incompatible with terminal equipment having supervisory signaling that requires a DC ground reference. Such is the case with a PBX having ground start supervisory signaling. Simply grounding one conductor of an electrically isolated line unbalances the impedance of the two line conductors. As a result, a 60-hertz signal is introduced on the line. Connecting a large inductor between one conductor of the line and ground provides a DC ground reference while keeping the line longitudinally balanced, but the large size of the required inductor is prohibitive. A drawback is that the large inductor can generate hazardous voltages on the line when the line current is interrupted.

In one prior art solution to another problem associated with electrically isolated lines, an anticorrosion biasing circuit keeps the polarity of the DC voltage on an electrically isolated line negative. This circuit is presently used with the electrically isolated lines of the 5ESS TM switch that is manufactured by AT&T Technologies, Inc. Positive polarity voltages cause the corrosion of telephone lines. Since the biasing circuit senses only positive polarity voltages from the battery feed circuit, negative polarity voltage fluctuations may cause false ground start supervisory signaling indications. Thus, this anticorrosion biasing circuit is not suitable for ground start supervisory signaling applications.

SUMMARY OF THE INVENTION

The foregoing problems are solved and a technical advance is achieved by a circuit for maintaining the DC voltage on an electrically isolated line at a reference level, such as ground potential, while maintaining the high AC line impedance required for longitudinal balance. The circuit includes filter means such as a low-pass filter for passing only the voltage on the line below a predetermined frequency. Difference means such as an inverting differential amplifier subtracts the passed voltage from a reference level voltage to form a difference voltage. When the polarity of the difference voltage is positive, first means such as a voltage-to-current source supplies current to the line to raise the DC voltage on the line to the reference level. When the polarity of the difference voltage is negative, second means such as another voltage-to-current source sinks or, more particularly, diverts current from the line to lower the DC voltage on the line to the reference level.

In one illustrative embodiment of the invention, the circuit consists of a negative feedback circuit comprising a low-pass filter, a difference amplifier, and two voltage-to-current sources with high output impedances. The low-pass filter passes only the voltage on the line below a predetermined frequency. The difference amplifier subtracts the passed voltage from a ground potential reference voltage to form a difference voltage. Also included in the circuit are two voltage shifters. When the polarity of the difference voltage is positive, one voltage shifter raises the level of the difference voltage to turn on one of the voltage-to-current sources to supply current to the line. This supply current causes the DC voltage on the line to rise to the reference level. When the polarity of the difference voltages is negative, the second voltage shifter lowers the level of the difference voltage to turn on the other voltage-to-current source to sink, or more particularly, dissipate current from the line. This dissipated current causes the DC voltage on the line to drop to the reference level.

In accordance with another feature of this invention to prevent the circuit from oscillating, the negative feedback circuit further includes load means such as a load resistor for limiting the gain of the circuit to less than unity at any frequency where the phase shift of any signal through the circuit is an integer multiple of 360 degrees.

BRIEF DESCRIPTION OF THE DRAWING

The invention may be better understood from the following detailed description when read with reference to the drawing in which.

DETAILED DESCRIPTION

Figure 1:
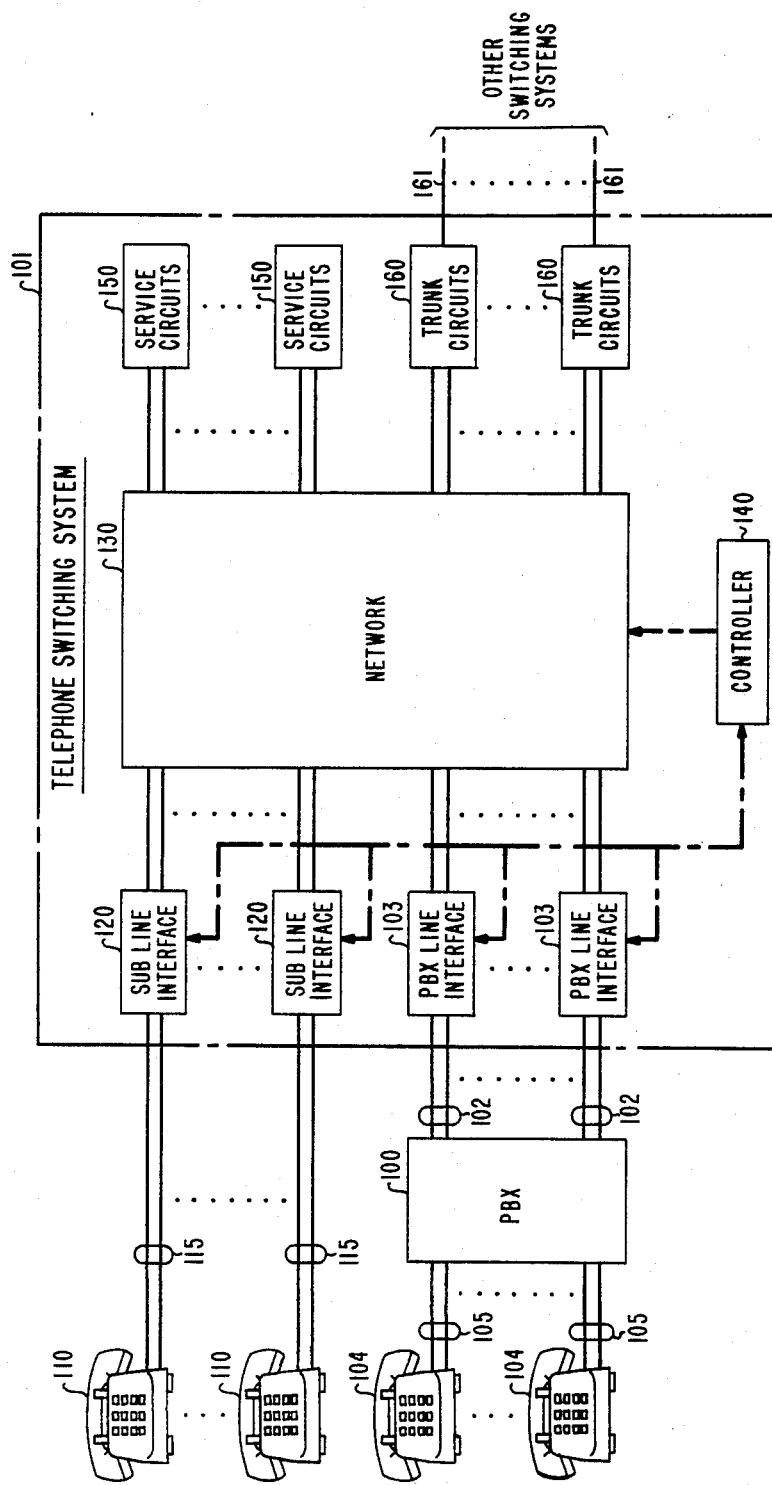
FIG. 1 is a general block diagram of a telephone switching system serving a plurality of subscriber station sets and a private branch exchange.

An arrangement employing the invention is illustrated in the block diagram of FIG. 1 in which private branch exchange (PBX) 100 is connected to telephone switching system 101 by communication lines 102 and PBX line interface circuits 103.

In accordance with this invention, PBX line interface circuit 103 includes a DC reference voltage circuit for maintaining the DC voltage on electrically isolated communication line 102 at a ground reference level. Thus, PBX line interface circuit 103 can now interface with the previously incompatible ground start supervisory signaling of PBX 100. Private branch exchange 100 uses well-known ground start supervisory signaling on communication lines 102 and serves a plurality of station sets 104 by means of communication lines 105. In addition, a plurality of telephone subscriber sets 110 is connected to the switching system by means of communication lines 115 and subscriber line interface circuits 120.

Local telephone switching system 101 is suitably an electronic switch of the type disclosed in *The Bell System Technical Journal,* Vol. 61, No. 4, Apr. 1982. By way of example, telephone switching system 101 comprises a switching network 130, PBX line interface circuits 103, subscriber line interface circuits 120, as well as a controller 140, service circuits 150, and trunk circuits 160.

As is customary, the line interface circuits provide an interface between communication lines and switching network 130. To reduce 60-hertz metallic voltages resulting from longitudinal currents, communication lines 102 and 115 along with line interface circuits 103 and 120 are electrically isolated from ground. Typically, this is accomplished by a transformer coupling the line and the AC voice signals to the switching networks. In addition, there are no direct or low AC impedance connections from the line to ground. Any AC connections from the line to ground are through a high impedance. That is, an impedance typically in excess of 100 K ohms and definitely in excess of the leakage resistance of the line, commonly, 30 K ohms. Each of subscriber line interface circuits 120 is suitably a telephone subscriber line circuit disclosed in U.S. Pat. Nos. 4,056,689 and 4,056,691. The subscriber line interface circuit includes a floating current source supplying a limited current substantially independent of loop length and includes circuitry for line supervision and dial pulse signal detection.

PBX line interface circuits 103 are similar to subscriber line interface circuits 120. However, in accordance with this invention, the PBX line interface circuit also includes a DC reference voltage circuit for maintaining the DC voltage on the tip conductor of communication line 102 at a reference level such as ground potential for the ground start supervisory signaling of PBX 100. The PBX line interface circuit further includes means for ground start signaling while preventing the introduction of annoying 60-hertz signals on the line.

Service circuits 150 generally include such circuits such as test circuits, tone circuits, etc. The trunk circuits provide an interface for a plurality of telecommunication lines 161 connected to other switching systems. The controller senses the operational state and activities of the line, service, and trunk circuits to receive signaling information; controls the network to establish connections between the various circuits; and controls the states of the circuits as required.

Figure 2:
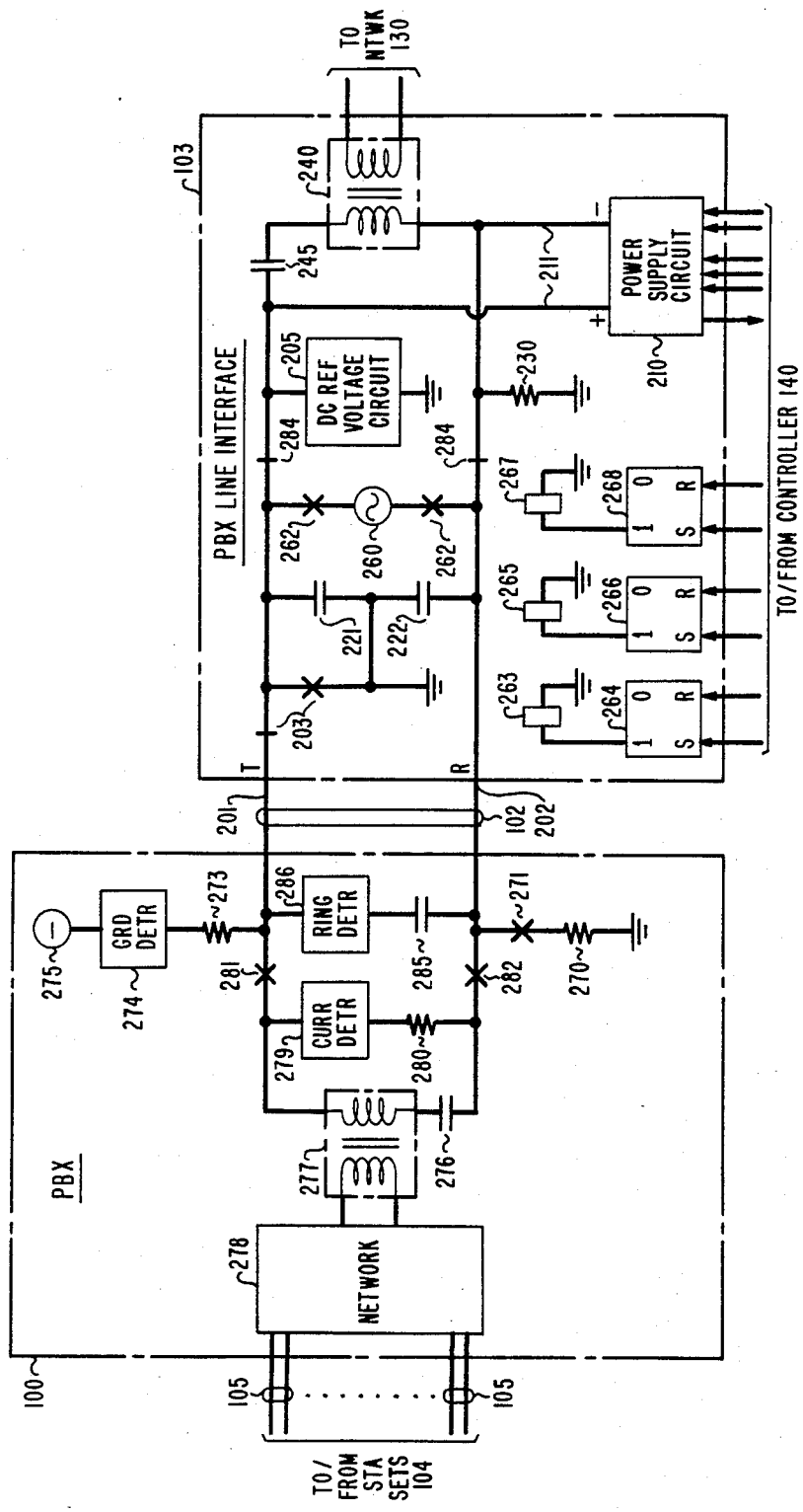
FIG. 2 is a detailed diagram of a PBX line interface circuit serving the PBX shown in the diagram of FIG. 1.

The details of PBX line interface circuit 103 are depicted in FIG. 2. Tip (T) lead 201 and ring (R) lead 202 of communication line 102 connect one end of the PBX line circuit to PBX 100. The secondary winding of transformer 240 couples the other end of the interface circuit to network 130. The primary winding of the transformer is connected across the tip and ring leads of the line through DC blocking capacitor 245. Also connected to tip lead 201 are well-known make and break transfer contacts 203 that control the flow of current in the tip lead.

Floating power supply circuit 210 supplies direct current to the line and the PBX via conductors 211. The floating power supply circuit also detects direct current flow in the line and so indicates to controller 140. A floating power supply circuit suitable for use in the PBX line interface circuit is described in detail in U.S. Pat. No. 4,056,689 and need not be described herein for the reader to understand the present invention.

In accordance with this invention, DC reference voltage circuit 205 maintains the DC voltage on tip lead 201 at a reference level such as ground for the ground start supervisory signaling of PBX 100. Connected between the ring lead and ground, balancing resistor 230 has an impedance equivalent to the high AC impedance of the DC reference voltage circuit and maintains the AC impedance balance on the tip and ring leads. When line 102 is in an idle state, the PBX presents an open circuit to the ring lead of the line, and PBX line interface circuits presents an open circuit to the tip lead by operating break transfer contacts 203. Thus, DC current will not flow in the line.

By way of example, PBX 100 has current limiting resistor 270 connected between ground and ring lead 202 through make contacts 271. Current limiting resistor 273 and ground detector 274 such as a high impedance voltmeter are connected in series between negative potential source 275 and tip lead 201. Connected in series with DC blocking capacitor 276 across the tip and ring leads, transformer 277 couples voice signals from the line to switching network 278 that serves station sets 104. Also connected in series across the line for DC supervisory signaling are current detector 279 and current limiting resistor 280. As shown, make contacts 281 and 282 connect the previous two branches of components to the tip and ring leads 201 and 202, respectively. A third branch of components consisting of serially connected DC blocking capacitor 285 and ring detector 286 is also connected across the tip and ring leads in front of make contacts 281 and 282.

When one of station sets 104 goes off-hook, the PBX scans line 102 for an idle condition. When idle, PBX line interface circuit operates transfer contacts 203 to present an open circuit to tip lead 201 and to ground positive (+) lead 211 of power supply circuit 210. When tip lead 201 is not at ground potential, the PBX seizes the idle line by grounding the ring lead through make contacts 271. As a result, current flows in the ring lead from the PBX through floating power supply circuit 210 to DC reference voltage circuit 205 and make transfer contacts 203 both at ground potential. The floating power supply circuit detects current flow and reports this condition to the controller as an origination on the line. The controller releases transfer contacts 203 to put the tip lead at ground potential via DC reference voltage circuit 205. Controller 140 causes make and break transfer contacts 203 to operate via relay 263 and S-R flip-flop 264. After sensing a ground potential on the tip lead, the PBX closes make contacts 281 and 282 and opens make contacts 271. Loop current now flows which is detected by current detector 279. PBX 100 then transmits either dial pulse or dual tone multifrequency address signals to the switching system 101 in a well-known manner. Dial pulse address signals are detected by floating power supply circuit 210 and reported to the controller, whereas dual tone multifrequency address signals are reported to the controller via one of service circuits 150 connected to the interface circuit via network 130.

Controller 140 translates the address digits and causes the network to switch the PBX line interface circuit to the indicated subscriber station. The call assumes the well-known talk state. The PBX monitors the station set for a disconnect, whereas the switch monitors the PBX for a disconnect.

When the call is completed, the PBX station set goes on-hook. The PBX detects this condition and opens make contacts 281 and 282. Monitoring the PBX, the floating power supply circuit no longer detects current flow in the tip and ring loop and reports this condition to the controller. The controller disconnects the subscriber station set from the PBX line interface circuit and operates transfer contacts 203 returning the PBX line interface circuit to an idle state. Closed make transfer contacts 203 connect the positive (+) lead 211 to ground. With break transfer contact 203 open, the PBX no longer detects ground potential on the tip lead and assumes the line is in an idle state ready for seizure again.

In the case of an originating call from one of subscriber station sets 110, dial tone will be supplied to the subscriber, and address information collected. When the call is to a PBX station, ringing current must be supplied to line 102. Since network 130 may comprise solid-state cross points, which are not designed to withstand voltages of a magnitude customarily generated by available ringing tone generators, ringing current is applied to line 102 by ringing current generator 260 by means of make relay contacts 262. Relay 265 which operates make contacts 262 is controlled by S-R flip-flop 266 which, in turn, is set and reset from controller 140. Transfer contacts 203 are released to connect the ringing generator to the tip lead. To isolate the line from network 130 during ringing, break relay contacts 284 are opened. Relay 267 which operates break contacts 284 is controlled by S-R flip-flop 268. When the PBX senses ringing current via well-known ringing detector 286 or ground potential on the tip lead, the PBX operates make contacts 281 and 282. The ringing generator senses the ring trip, or the power supply circuit senses current flow in the loop. The calling subscriber then supplies address information to a PBX attendant. The attendant alerts the desired PBX station, and the call assumes the well-known talk state. When the call is finished, the call is processed as previously described. Ground start signaling is also described in detail in the *Bell System Technical Reference,* "Description of the Analog Voiceband Interface Between the Bell System Local Exchange Lines and Terminal Equipment", PUB 61100, January 1983.

Advantageously, AC signals in the line interface circuit are not referenced to earth ground. Consequently, so-called longitudinal currents induced in communication lines from adjacent electrical power lines, primarily 60-hertz alternating currents, will not find a path to ground through the circuit, and hence will not interfere with the operation of the circuit. To reduce RF interference, a pair of balancing capacitors 221 and 222 are connected between the tip and ring leads of the line and earth ground, respectively. However, these may be small capacitors, for example, on the order of 0.03 microfarads, which will not conduct a significant amount of the 60-hertz alternating currents. As previously described, balancing resistor 230, typically in the range of 100 K ohms, is connected to the ring lead to balance the high AC impedance presented by DC reference voltage circuit 205.

Figure 3:
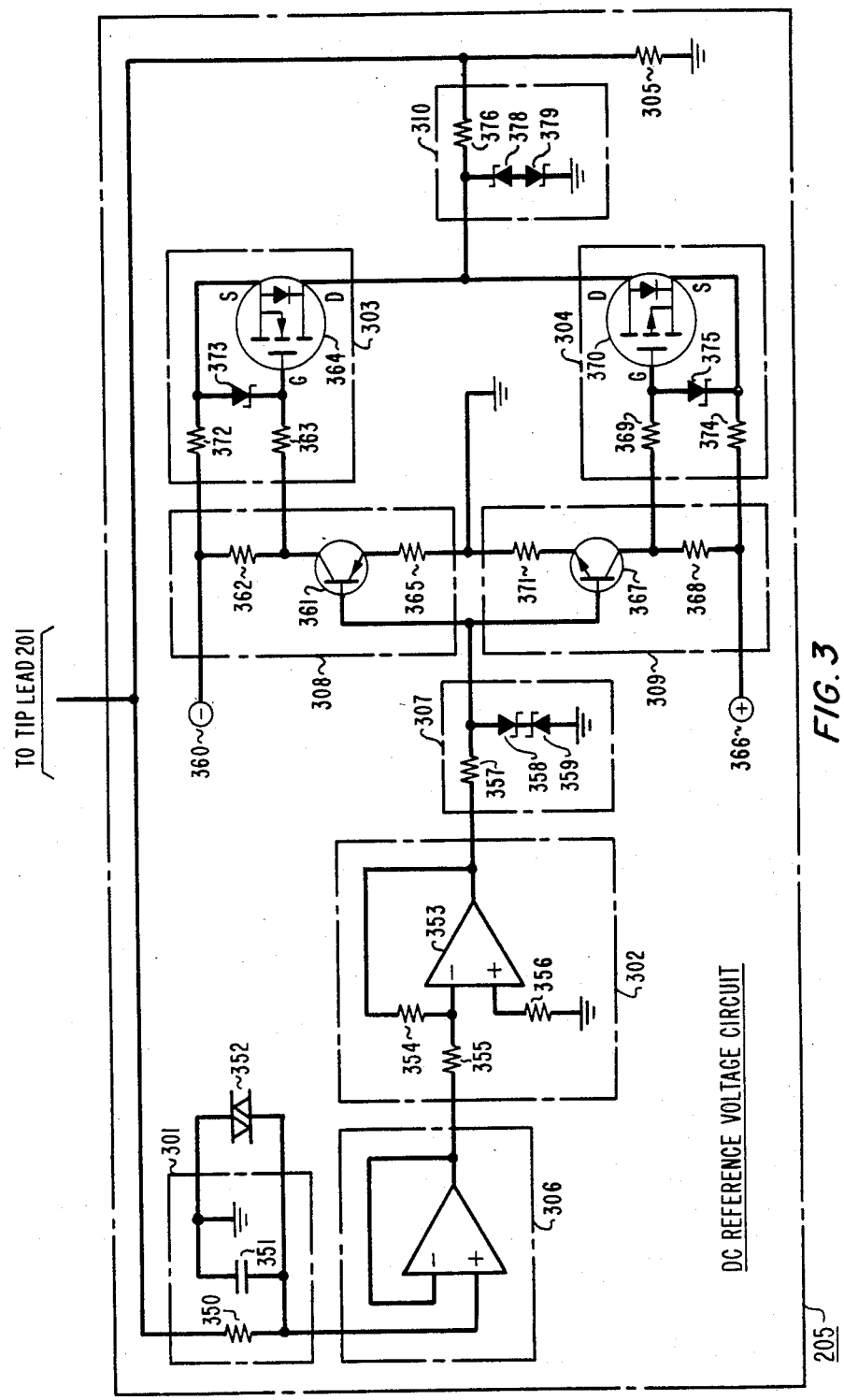
FIG. 3 is a detailed diagram of the DC reference voltage circuit of the PBX line interface circuit shown in FIG. 2.

Depicted in FIG. 3 is an illustrative embodiment of DC reference voltage circuit 205 for maintaining the tip lead of electrically isolated telecommunication line 102 at a reference level such as ground. This circuit is a negative feedback circuit and responds only to the voltage on the line below a predetermined frequency. Depending on whether the line voltage is either above or below the reference level, the circuit will either supply current to the line to raise or divert current from the line to lower the voltage on the line to the reference level. The feedback circuit basically comprises low-pass filter 301, difference amplifier 302, voltage-to-current sources 303 and 304, and load resistor 305. The input of low-pass filter 301 is connected to the tip lead of the line and passes only the voltage on the line below the cut-off frequency of the filter. This cut-off frequency such as, for example, 4 Hz, is determined by the RC time constant of the filter. The filter comprises resistor 350 and capacitor 351 serially connected between the tip lead and ground. These components are chosen to have a high AC and DC impedance that does not load the line. Connected across the capacitor is varistor 352 to protect capacitor 351 and buffer amplifier 306 from excessive voltage conditions that may be experienced on the line.

The buffer amplifier comprises non-inverting operational amplifier 306 for buffering the high DC output impedance of the low-pass filter to the input impedance of inverting amplifier 302.

Difference amplifier 302 comprises operational amplifier 353 for subtracting the passed voltage from a reference level voltage such as ground potential to form a difference voltage. The amplifier also shifts the phase of any signal passed therethrough by 180 degrees. The inverting input of the amplifier is connected to its output through feedback resistor 354. In addition, the inverting input of the amplifier is also connected to the output of buffer amplifier 306 through input resistor 355. The feedback and input resistors control the gain of operational amplifier 353. The non-inverting input of the amplifier is connected to ground reference through input balancing resistor 356. The difference voltage formed by the difference amplifier is applied to voltage limiter circuit 307.

Voltage limiter circuit 307 limits the magnitude of the difference voltage from difference amplifier 302 that is applied to voltage shifter circuits 308 and 309. Voltage limiter circuit 307 comprises current limiting resistor 357 and oppositely poled zener diodes 358 and 359. The zener diodes limit the magnitude of the positive and negative polarity difference voltage applied to the voltage shifters.

When the polarity of the difference voltage is negative, voltage shifter 308 lowers the negative difference voltage to a predetermined level to turn on voltage-tocurrent source 303. A negative polarity difference voltage indicates a line voltage level higher than the reference level. In response to the shifted voltage, voltage-to-current source 303 diverts or, more commonly, sinks the current from the line to negative potential source 360. Sinking current from the line lowers the voltage on the line to the reference level. Voltage shifter 308 comprises PNP transistor 361 with its base connected to the output of difference amplifier 302 through voltage limiter circuit 307. The collector is connected through current limiting and biasing resistor 362 to negative potential source 360 and through current limiting resistor 363 to the gate of N-channel enhancement MOS field effect transistor 364. The emitter of transistor 361 is connected to ground through current limiting and biasing resistor 365.

When the polarity of the difference voltage is positive, voltage shifter 309 raises the positive polarity difference voltage to a predetermined level to turn on voltage-to-current source 304. A positive polarity difference voltage indicates a line voltage level lower than the reference level. In response, voltage-to-current source 304 supplies or, more commonly, sources current to the line from positive potential source 366. This raises the line voltage to the reference level. Voltage shifter 309 comprises NPN transistor 367 with its base connected to the output of difference amplifier 302 through voltage limiter 307. The collector is connected through current limiting and biasing resistor 368 to positive potential source 366 and through current limiting resistor 369 to the gate of P-channel enhancement MOS field effect transistor 370. The emitter of the transistor 367 is connected through current limiting and biasing resistor 371 to ground.

Voltage-to-current source 303 comprises N-channel enhancement MOS field effect transistor 364 having a high AC output impedance. The source terminal of the transistor is connected through negative feedback and current limiting resistor 372 to negative potential source 360. The negative feedback resistor limits the gain of the transistor. Interconnecting the source and gate terminals of the transistor is zener diode 373 that keeps the gate-to-source voltage below breakdown in the event of a voltage hit on the line. The drain terminal of the transistor is connected to the line through voltage limiter 310. Voltage limiter 310 comprises resistor 376 and oppositely poled zener diodes 378 and 379. As previously described, voltage-to-current source 303 sinks current from the line to lower the line voltage down to the reference level.

Voltage-to-current source 304 comprises P-channel enhancement MOS field effect transistor 370 with its source terminal connected through negative feedback and current limiting resistor 374 to positive potential source 366. Connected between the gate and source of the transistor is zener diode 375. The drain terminal of the transistor is connected similarly to the line through voltage limiter 310. Voltage-to-current source 304 supplies current to the line to raise the line voltage up to the reference level.

To prevent the negative feedback circuit from oscillating, load resistor 305 is connected between ground and the drain terminal of the two field effect transistors. The load resistor limits the voltage gain of the two voltage-to-current sources as well as the overall gain of the feedback circuit to prevent oscillations. Since this load resistor may load the AC impedance of the tip lead, resistor 230 is connected to the ring lead of the line to balance longitudinal currents as was previously described. Resistors 230 and 305 are equivalent and are chosen to have a high resistance.

When the phase of any current or voltage signal through the feedback circuit is shifted an integer multiple of 360 degrees and the loop gain is equal to or greater than unity, the feedback circuit will oscillate. To prevent this condition, difference amplifier 302 shifts the phase of the signal 180 degrees. The impedance of the line and the low-pass filter will shift the phase of any signal toward 360 degrees. However, as the circuit shifts the phase of any signal toward an integer multiple of 360 degrees, the gain of the feedback circuit is decreased by the low-pass filter and the load resistor to less than unity. Thus, low-pass filter 301 and load resistor 305 cause the feedback circuit to have less than unity gain at any frequency where the phase shift of any signal through the circuit is an integer multiple of 360 degrees.

The use of voltage-to-current sources allows the feedback circuit to have a very high output impedance while retaining the capability to hold its DC output voltage at a reference level. Thus, the impedance balance between the tip and ring leads can be maintained.

It is to be understood that the above-described negative feedback circuit is merely an illustrative embodiment of the principals of this invention and that numerous other arrangements may be devised by those skilled in the art without departing from the spirit and scope of the invention. In particular, inverting difference amplifier may be connected to a reference level other than ground to maintain the level of a circuit at the new reference level. Furthermore, the DC reference voltage circuit may be used to maintain any electrically isolated conductor or circuit at a desired reference level.

What is claimed is:

1. A circuit for maintaining the DC voltage on an electrically isolated line at a reference level, comprising:
    filter means for passing only the voltage on said line below a predetermined frequency,
    difference means for subtracting the passed voltage from a reference voltage at said reference level to form a difference voltage,
    first voltage-to-current means for sourcing current to said line to maintain the DC voltage on said line at said reference level when the polarity of said difference voltage is positive, and
    second voltage-to-current means for sinking current from said line to maintain the DC voltage on said line at said reference level when the polarity of said difference voltage is negative.

2. The circuit of claim 1 wherein said circuit further comprises first voltage limiter means for limiting the magnitude of the DC voltage on said line.

3. The circuit of claim 1 wherein said circuit further comprises second voltage limiter means for limiting the magnitude of said difference voltage.

4. The circuit of claim 1 wherein said circuit further comprises buffer means for buffering the impedances of said filter means and said difference means.

5. The circuit of claim 1 wherein said circuit further comprises third voltage limiter means for limiting the magnitude of said passed voltage.

6. The circuit of claim 1 wherein said circuit further comprises voltage shifter means for raising said difference voltage a predetermined voltage when the polarity of said difference voltage is positive and wherein said first voltage-to-current means is responsive to said difference voltage raised said predetermined voltage for sourcing said current to said line.

7. The circuit of claim 1 wherein said circuit further comprises voltage shifter means for lowering said difference voltage a predetermined voltage when the polarity of said difference voltage is negative and wherein said second voltage-to-current means is responsive to said difference voltage lowered said predetermined voltage for sinking said current from said line.

8. The circuit of claim 1 wherein said circuit further comprises load means for limiting the gain of said circuit to less than unity at any frequency where the phase shift of said circuit is an integer multiple of 360 degrees.

9. The circuit of claim 8 wherein said circuit further comprises first voltage shifter means for raising said difference voltage a first predetermined voltage when the polarity of said difference voltage is positive and wherein said first voltage-to-current means is responsive to said difference voltage raised said first predetermined voltage for sourcing said current to said line.

10. The circuit of claim 9 wherein said circuit further comprises second voltage shifter means for lowering said difference voltage a second predetermined voltage when the polarity of said difference voltage is negative and wherein said second voltage-to-current means is responsive to said difference voltage lowered said second predetermined voltage for sinking said current from said line.

11. The circuit for claim 10 wherein said circuit further comprises first voltage limiter means for limiting the magnitude of said DC voltage on said line.

12. The circuit of claim 11 wherein said circuit further comprises second voltage limiter means for limiting the magnitude of said difference voltage.

13. The circuit of claim 12 wherein said circuit further comprises buffer means for buffering the impedances of said filter means and said difference means.

14. The circuit of claim 13 wherein said circuit further comprises third voltage limiter means for limiting the magnitude of said passed voltage.

15. A negative feedback circuit for maintaining the DC voltage on an electrically isolated line at a reference level, comprising:
   filter means for passing only the voltage on said line below a predetermined frequency,
   difference means for subtracting said passed voltage from a reference voltage at said reference level to form a difference voltage,
   first voltage-to-current means for sourcing current to said line to maintain the DC voltage on said line at said reference level when the polarity of said difference voltage is positive, and
   second voltage-to-current means for sinking current from said line to maintain the level of said DC voltage on said line at said reference level when the polarity of said difference voltage is negative, and
   load means for limiting the gain of said circuit to less than unity at any frequency where the phase shift of said circuit is an integer multiple of 360 degrees.

16. The circuit of claim 15 wherein said difference means comprises an inverting differential amplifier.

17. The circuit of claim 15 wherein each of said first and second voltage-to-current means comprises a field effect transistor having a high output impedance.

18. The circuit of claim 15 wherein said filter means comprises a low-pass filter having high AC and DC input impedances.

19. The circuit of claim 15 wherein said circuit further comprises first voltage shifter means for raising said difference voltage a first predetermined voltage when the polarity of said difference voltage is positive and wherein said first voltage-to-current means is responsive to said difference voltage raised said first predetermined voltage for sourcing said current to said line.

20. The circuit of claim 19 wherein said circuit further comprises second voltage shifter means for lowering said difference voltage a second predetermined voltage when the polarity of said difference voltage is negative and wherein said second voltage-to-current means is responsive to said difference voltage lowered said second predetermined voltage for sinking said current from said line.

* * * * *